(12) United States Patent
Grasset et al.

(10) Patent No.: US 9,147,221 B2
(45) Date of Patent: Sep. 29, 2015

(54) IMAGE-DRIVEN VIEW MANAGEMENT FOR ANNOTATIONS

(71) Applicant: QUALCOMM INCORPORATED, San Diego, CA (US)

(72) Inventors: Raphael Grasset, Graz (AT); Markus Tatzgern, Graz (AT); Tobias Langlotz, Graz (AT); Denis Kalkofen, Graz (AT); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 13/720,735

(22) Filed: Dec. 19, 2012

(65) Prior Publication Data

US 2013/0314441 A1 Nov. 28, 2013

Related U.S. Application Data

(60) Provisional application No. 61/650,884, filed on May 23, 2012.

(51) Int. Cl.
*G06T 7/00* (2006.01)
*G06T 19/00* (2011.01)
*G06T 1/00* (2006.01)
(Continued)

(52) U.S. Cl.
CPC ............... *G06T 1/00* (2013.01); *G06T 7/0042* (2013.01); *G06T 11/00* (2013.01); *G06T 11/60* (2013.01); *G06T 19/006* (2013.01)

(58) Field of Classification Search
USPC ........................... 345/629, 633; 382/181, 190
See application file for complete search history.

(56) References Cited

U.S. PATENT DOCUMENTS

| 2010/0085383 | A1 | 4/2010 | Cohen et al. |
| 2011/0164163 | A1* | 7/2011 | Bilbrey et al. ................ 382/190 |
| 2011/0287811 | A1* | 11/2011 | Mattila et al. ................ 382/190 |

(Continued)

FOREIGN PATENT DOCUMENTS

| EP | 2378392 A1 | 10/2011 |
| WO | 2012033768 A2 | 3/2012 |

OTHER PUBLICATIONS

Ali K., et al., "Label Layout for Interactive 3D Illustrations", The Journal of WSCG, Jan. 31, 2005, pp. 1-8, XP055012513, Retrieved from the Internet: URL: http://citeseerx.ist.psu.edu/viewdoc/summary? doi=10.1.1.68.9292 [retrieved on Nov. 18, 2011] p. 1.

(Continued)

*Primary Examiner* — Chante Harrison
(74) *Attorney, Agent, or Firm* — Silicon Valley Patent Group LLP

(57) ABSTRACT

A mobile device uses an image-driven view management approach for annotating images in real-time. An image-based layout process used by the mobile device computes a saliency map and generates an edge map from a frame of a video stream. The saliency map may be further processed by applying thresholds to reduce the number of saliency levels. The saliency map and edge map are used together to determine a layout position of labels to be rendered over the video stream. The labels are displayed in the layout position until a change of orientation of the camera that exceeds a threshold is detected. Additionally, the representation of the label may be adjusted, e.g., based on a plurality of pixels bounded by an area that is coincident with a layout position for a label in the video frame.

40 Claims, 6 Drawing Sheets

(51) Int. Cl.
   *G06T 11/00* (2006.01)
   *G06T 11/60* (2006.01)

(56) References Cited

U.S. PATENT DOCUMENTS

| | | |
|---|---|---|
| 2012/0013640 A1 | 1/2012 | Chen |
| 2012/0075433 A1 | 3/2012 | Tatzgern et al. |
| 2012/0076297 A1 | 3/2012 | Koziol et al. |
| 2014/0247278 A1* | 9/2014 | Samara et al. ................. 345/633 |

OTHER PUBLICATIONS

International Search Report and Written Opinion—PCT/US2013/038253—ISA/EPO—Aug. 16, 2013.

Azuma, et al., "Evaluating Label Placement for Augmented Reality View Management," Proceedings of IEEE/ACM Int'l Symp. on Mixed and Augmented Reality (ISMAR 2003) (Tokyo, Oct. 7-10, 2003), pp. 66-75.

Bell, et al., "An Annotated Situation-Awareness Aid for Augmented Reality," Proc. UIST '02, ACM Symp. on User Interface Software & Technology, Paris, France, Oct. 27-30, 2002, pp. 213-216.

Bell, et al., "View Management for Virtual and Augmented Reality," UIST 2001 (ACM Symp. on User Interface Software and Technology), Orlando, FL, Nov. 11-14, 2001, pp. 101-110.

Gabbard, et al., "Active Text Drawing Styles for Outdoor Augmented Reality: A User-Based Study and Design Implications," Virtual Reality Conference, IEEE, 2007, pp. 35-42.

Gabbard L., et al., "An Empirical User-based Study of Text Drawing Styles and Outdoor Background Textures for Augmented Reality", In Proceedings of the 2005 IEEE Conference 2005 on Virtual Reality (VR '05). IEEE Computer Society, Washington, DC, USA, pp. 1-8.

Haro, et al., "Mobile camera-based adaptive viewing," In Proceedings of the 4th international conference on Mobile and ubiquitous multimedia (MUM '05). ACM, New York, NY, USA, pp. 78-83.

Hong, et al., "Dynamic captioning: video accessibility enhancement for hearing impairment," In Proceedings of the international conference on Multimedia (MM '10). ACM, New York, NY, USA, pp. 421-430.

Kalkofen, et al., "Chapter 3: Visualization Techniques for Augmented Reality," Handbook of Augmented Reality, Springer Science and Business Media, LLC 2011, pp. 65-98.

Leykin, et al., "Automatic Determination of Text Readability over Textured Backgrounds for Augmented Reality Systems" In Proceedings of the 3rd IEEE/ACM International Symposium on Mixed and Augmented Reality (ISMAR '04). IEEE Computer Society, Washington, DC, USA, pp. 224-230.

Rosten et al., "Real-Time Video Annotations for Augmented Reality," ISVC 2005: pp. 294-302.

Shibata, et al., "A view management method for mobile mixed reality systems," Eurographics Virtual Environments 2008 (EGVE 2008) Symp. Proc., pp. 17-24.

Tenmoku, et al., "Annotating User-Viewed Objects for Wearable AR Systems," In Proceedings of the 4th IEEE/ACM International Symposium on Mixed and Augmented Reality (ISMAR '05), pp. 1-2.

Thanedar, et al., "Semi-Automated Placement of Annotations in Video", Technical Report #2004-11, Department of Computer Science, UC, Santa Barbara, Apr. 2004, pp. 1-8.

Uratani, et al., "A Study of Depth Visualization Techniques for Virtual Annotations in Augmented Reality," In Proceedings of the 2005 IEEE Conference 2005 on Virtual Reality (VR '05). IEEE Computer Society, Washington, DC, USA, pp. 295-296.

Zhang B., et al., "Annotating and navigating tourist videos", In Proceedings of the 18th SIGSPATIAL International Conference on Advances in Geographic Information Systems (GIS '10). ACM, New York, NY, USA, pp. 260-269.

* cited by examiner

IMAGE-DRIVEN VIEW MANAGEMENT FOR ANNOTATIONS

CROSS-REFERENCE TO RELATED APPLICATION(S)

This application claims priority under 35 USC 119 to U.S. Provisional Application No. 61/650,884, filed May 23, 2012 and entitled "Image-Driven View Management for Annotations in Outdoor Augmented Reality" which is assigned to the assignee hereof and which is incorporated herein by reference.

BACKGROUND

1. Background Field

Embodiments of the subject matter described herein are related generally to view management for annotations in display systems and more specifically to using an image-based layout process for view management.

2. Relevant Background

Augmented Reality (AR) presents the display of digital information registered to real world objects and places. One example of AR is the annotation of images or a video stream of real world buildings and places with textual or pictorial information. An Augmented Reality Browser (ARB) is a type of AR application, in which labels are used to allow end-users to visualize, browse and search digital data in the context of their real world environment. The digital information is displayed on the end-users cellular telephone, smart phone, etc., over the video feed of the real world environment.

In conventional systems, digital information is typically registered based on pure geographical location, usually given as a point of interest (POI) with a corresponding position, e.g., as determined by a Global Positioning System (GPS). Typically, no further scene knowledge, such as a 3D model of the environment, is available to the system. Moreover, even if a 3D model is provided, the error-prone registration of sensor-based tracking typically does not permit an efficient use of the additional scene knowledge. Further, real world environments change dynamically and thus, a previously generated 3D model may not provide an up-to-date representation of the real world. Accordingly, view management techniques that rely on the availability of a precisely registered detailed three-dimensional representation of the environment are not used in current systems.

As no other information is typically available, the placement of iconic or textual information, i.e., labels, to annotate POIs is conventionally performed using a projection of the labels to the display screen, which is determined by the POI's GPS position and the current tracking information for the camera. The result is often a cluttered scene with labels occluding each other and important real-world information. Consequently, the visual quality of conventional systems suffers from the poor placement or representation of labels over a view of the real world provided by a camera.

SUMMARY

A mobile device uses an image-driven view management approach for annotating images in real-time. An image-based layout process used by the mobile device computes a saliency map and generates an edge map from a frame of a video stream. The saliency map may be further processed by applying thresholds to reduce the number of saliency levels. The saliency map and edge map are used together to determine a layout position of labels to be rendered over the video stream. The labels are displayed in the layout position until a change of orientation of the camera that exceeds a threshold is detected. Additionally, the representation, e.g., contrast, of the label may be adjusted, e.g., based on a plurality of pixels bounded by an area that is coincident with the layout position of the label in the video frame.

In one implementation, a method includes storing one or more labels to be rendered; capturing a video stream of an environment with a camera; computing a saliency map of at least one frame from the video stream; generating an edge map with edges extracted from the at least one frame; using the saliency map and the edge map to determine a first layout position of the one or more labels to be rendered over the video stream; rendering the one or more labels over the video stream in the first layout position as the video stream is displayed; detecting a change in orientation of the camera with respect to the orientation in a previous frame that is greater than a threshold; and displaying the one or more labels in the first layout position until the change in orientation of the camera is detected.

In one implementation, an apparatus includes a camera that captures a video stream of an environment; motion sensors that produce data in response to movement; a display; memory for storing one or more labels to be rendered; and a processor coupled to the display, coupled to the camera to receive the video stream of the environment, coupled to the motion sensors to receive the data in response to the movement, and coupled to the memory for receiving the one or more labels to be rendered, the processor configured to compute a saliency map of at least one frame from the video stream, generate an edge map with edges extracted from the at least one frame, use the saliency map and the edge map to determine a first layout position of the one or more labels to be rendered over the video stream, and render the one or more labels over the video stream in the first layout position as the video stream is displayed on the display, detect a change in orientation of the camera with respect to the orientation in a previous frame that is greater than a threshold using the data produced by the motion sensors, and display the one or more labels in the first layout position until the change in orientation of the camera is detected.

In one implementation, an apparatus includes means for storing one or more labels to be rendered; means for capturing a video stream of an environment; means for computing a saliency map of at least one frame from the video stream; means for generating an edge map with edges extracted from the at least one frame; means for using the saliency map and the edge map to determine a first layout position of the one or more labels to be rendered over the video stream; means for rendering the one or more labels over the video stream in the first layout position as the video stream is displayed; means for detecting a change in orientation with respect to the orientation in a previous frame that is greater than a threshold; and means for displaying the one or more labels in the first layout position until the change in orientation is detected.

In one implementation, a storage medium including program code stored thereon, includes program code to compute a saliency map of at least one frame from a video stream captured by a camera; program code generate an edge map with edges extracted from the at least one frame; program code to use the saliency map and the edge map to determine a first layout position of one or more labels to be rendered over the video stream; program code to render the one or more labels over the video stream in the first layout position as the video stream is displayed; program code to detect a change in orientation of the camera with respect to the orientation in a previous frame that is greater than a threshold; and program code to display the one or more labels in the first layout position over the video stream until the change in orientation of the camera is detected.

DETAILED DESCRIPTION

Figure 1:
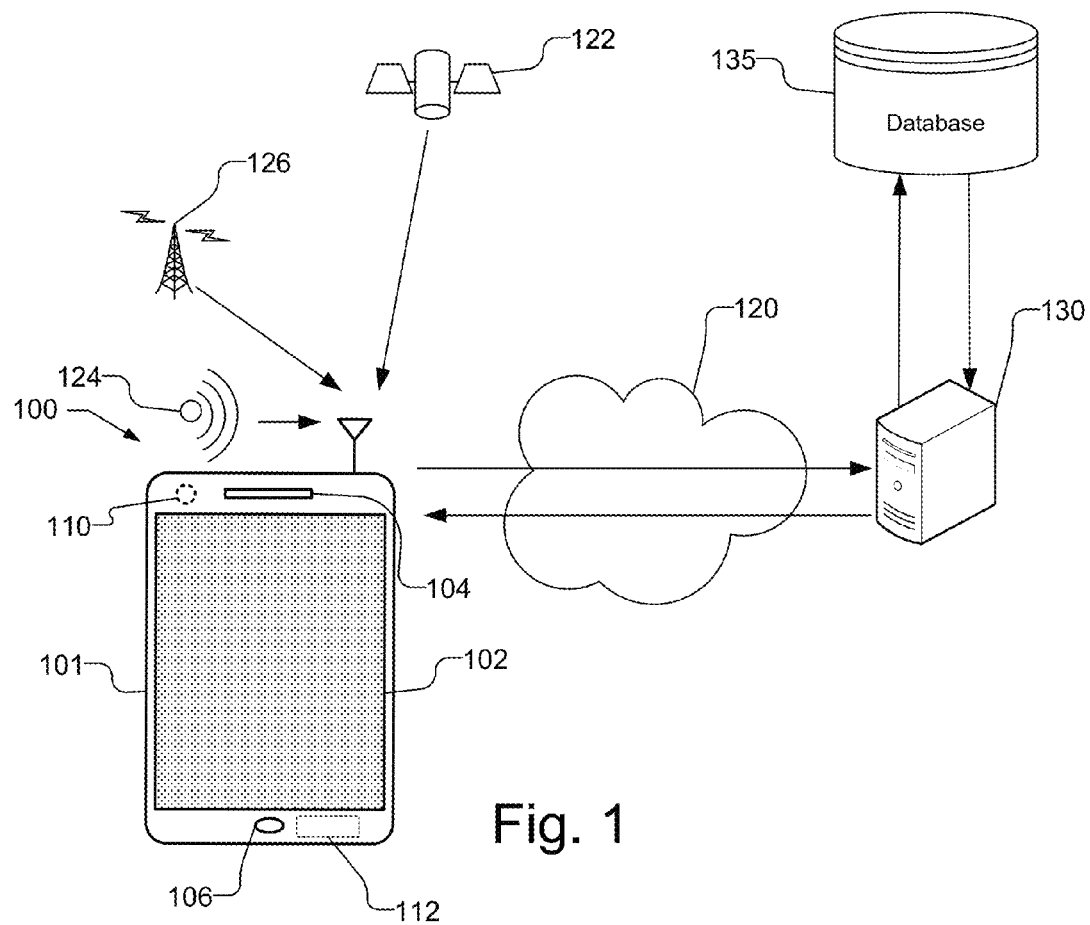
FIG. 1 illustrates a block diagram showing a mobile device that utilizes an image-driven view management process for annotating a video stream.

FIG. 1 illustrates a block diagram showing a mobile device 100 that utilizes an image-driven view management process for annotating a video stream. The view management includes the layout (point-based placement or labeling) as well as the representation of the labels, both of which are based on the analysis of the captured video frames.

FIG. 1 illustrates the front side of the mobile device 100 as including a housing 101, a display 102, which may be a touch screen display, as well as a speaker 104 and microphone 106. The mobile device 100 further includes a forward facing camera 110 to image the environment. The mobile device 100 may include motion sensors 112, such as a magnetometer, gyroscopes, accelerometers, etc. The mobile device 100 may be capable of determining its position using conventional positioning techniques, such as obtaining a position fix using satellite positioning system (SPS) 122, such as the well-known Global Positioning System (GPS), trilateration using wireless sources such as access points 124 or cellular towers 126, or using computer vision tracking technology, or a combination of any of such techniques, e.g., GPS with computer vision tracking technology. The mobile device 100 may access a database 135 using the remote server 130 via a wireless network 120 based on an approximate position of the mobile device 100 to obtain position dependent annotations to be rendered with respect to the image to be shown on display 102. For example, the server 130 and database 135 may be accessed through an augmented reality browser application running on the mobile device 100. As used herein, annotation and label describe textual or pictorial information to be overlaid on an image or video stream and annotation and label may be used interchangeably.

As used herein, a "mobile device" refers to any portable electronic device such as a cellular or other wireless communication device, personal communication system (PCS) device, personal navigation device (PND), Personal Information Manager (PIM), Personal Digital Assistant (PDA), or other suitable mobile device. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of capturing images (or video) of its environment.

Existing Augmented Reality browsers or AR annotations systems generally present poor view management. For example, labels are often displayed as overlapping with a large amount of visual clutter, and lack depth cues that map virtual content to real world points of interest. Additionally, in conventional systems, the layout of the labels, as well as the representation of the labels, does not consider the image over which the labels are rendered. For example, labels are often rendered overlaying important features in the image, such as buildings, people or real world signs. Additionally, labels may be rendered in a colors or tones that may be poorly contrasting or unappealing with respect to the image in general.

In contrast, mobile device 100 uses an image-based layout process built on saliency and an edge analysis of the video image. The saliency and edge analysis may be used together for the image based layout and is used to minimize overlay on important regions of an image and as parameters for a minimization problem. The minimization problem is formulated using an objective function (i.e. minimizing its values), where the penalty factors include one or more components of a desired design space.

Additionally, the image-based layout employed by mobile device 100 may provide visual coherence between the real (video image) and the virtual (labels) content. The representation of the labels, including the anchor, leader line, and background surrounding text of a label is adjusted based on the pixels in the image that is under the position of the labels. A global or local estimation of the luminance, saturation or hue of a video image (HLS or HSV spaces) may be used to modulate the color of the label's components.

Thus, the mobile device 100 is particularly useful for use with augmented reality systems in which there is a lack of scene knowledge, such as that found in current generation augmented reality browsers. The mobile device 100 may provide real-time annotation of images through the analysis of the captured video frames to determine the placement of the desired annotations, rendering an explicit knowledge of the scene unnecessary. The information derived from the captured video frames may be used to adjust the appearance of the annotations, e.g. such that the annotations are positioned so that interference with important real world information is reduced and so that each of the rendered annotation is readable over the background and easily related to its corresponding point of interest. Additionally, to account for the interactive nature of augmented reality, the mobile device 100 may maintain frame coherence of the displayed annotations.

Figure 2:
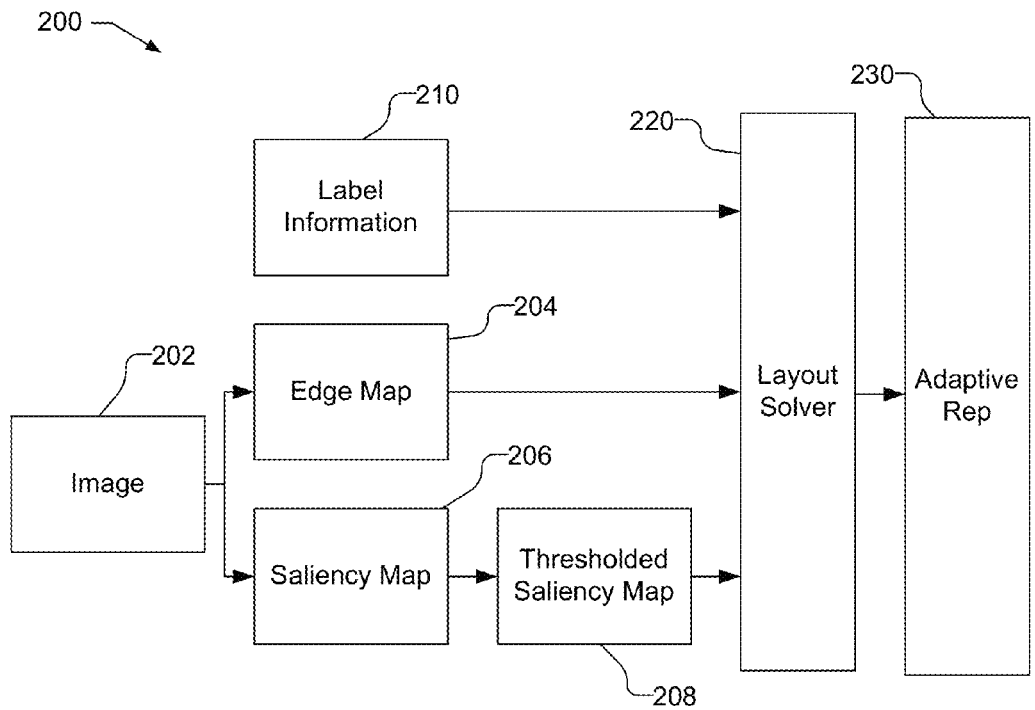
FIG. 2 is a block diagram illustrating an image-based layout process that may be used by the mobile device of FIG. 1.

FIG. 2 is a block diagram illustrating an image-based layout process 200 that may be used by the mobile device shown in FIG. 1. The image-based layout process 200 uses information from the frames of the captured video stream to control the position, i.e., layout, and the representation of the labels. Thus, a current image 202, e.g., a frame of the video stream captured by the mobile device 100, is received and analyzed to identify important areas in the image, so that important content in the image will not be occluded by the placement of labels. If desired, the current image 202 may be resized, e.g., by a factor size of 2 or 4 so that with a 640×480 pixel image, the image may be rescaled at 320×240 pixels or 160×120 pixels. The image 202 may be analyzed to generate an edge map 204 as well as a visual saliency map 206. The edge map 204 may be generated, e.g., using any desired edge detector, such as a Canny edge detector, that is applied to the image 202. Other edge detectors, such as Roberts Cross, Sobel, Prewitt, or Differential may be used if desired.

The saliency map 206 may be generated by any desired saliency computation, but it is desirable that the saliency computation be fast for real-time performance. The saliency computation should eliminate regular patterns in the image 202. Additionally, it may be advantageous for the resulting saliency map 206 to be the same size as the image 202 (or the resized image). While any desired saliency computation may be used, it has been found that one suitable saliency computation is described by R. Achanta and S. Susstrunk, "Saliency detection using maximum symmetric surround," In International Conference on Image Processing (ICIP), Hong Kong, September 2010, 2010. The resulting saliency map 206 is an intensity image, in which the grey levels represent the importance of the information in the image. Typically, a saliency computation will produce a relatively large number of saliency levels. Thus, as illustrated in FIG. 2, an initial saliency map 206 may be further processed to generate a second saliency map 208 that has a reduced number of saliency levels. The second saliency map 208 is produced, e.g., by applying one or more thresholds to the initial saliency map 206 to classify the desired number of saliency levels. For example, two thresholds may be applied to produce three levels of saliency in the second saliency map 208. Thresholds may have a uniform distribution, e.g., the different levels of saliency have the same size of range, or may have non-linear distribution, e.g., a smaller range is used for high salient values and a larger range is used for low salient values. Appropriate thresholds may be selected empirically or automatically based on camera response. Reducing the number of saliency levels with the second saliency map 208 may be advantageous as it offers a simplified representation of the saliency information for further processing.

As illustrated in FIG. 2, the edge map 204 and the resulting saliency map 208 are provided to a layout solver 220 along with the label information 210 for the image 202. The label information 210 may be obtained, e.g., from local storage on the mobile device 100 or from the server 130 and database 135 shown in FIG. 1, e.g., based on a determined position of the mobile device 100. The edge map 204 advantageously complements the saliency information (as provided by saliency map 208) because edges are often not prominent in the saliency map. Thus, taken together, the saliency information and the edge information may be used by the layout solver 220 to encode the pixel positions where labels should not be placed. The output of the layout solver 220 may be provided to an adaptive representation block 230, in which the representation of the labels, including the anchor, leader line, and background surrounding the text of a label may be adjusted based on the pixels in the image that is under the position of the labels.

The layout solver 220 may determine a layout for the labels as an optimization problem with defined and minimized objective functions. The objective function O encodes some of the standard graphics and real world considerations as weighted penalty factors:

$$O(L, x) = \sum_{i=1 \ldots n} \alpha_i p_i(L, x) \qquad \text{eq. 1}$$

where L defines the label, x its screen position, α the weight and p the penalty factor. Different penalties factors that may be used include the following:

Overlap of a label with a point of interest on the saliency map:

$$p_{IMAP}(L, x) = \sum_{i=1 \ldots sx, j=1 \ldots sy} IM(i, j) \qquad \text{eq. 2}$$

where sx and sy define the size of the label L and IM(i,y) is the value of the saliency map at the pixel position (i, j).

Overlap of a Label with the Point of Interest on the Edge Map:

$$p_{EMAP}(L, x) = \sum_{i=1 \ldots sx, j=1 \ldots sy} EM(i, j) \qquad \text{eq. 3}$$

where sx and sy define the size of the label L, and EM(i,y) is the value of the edge map at the pixel position (i, j).

Leader Line Length:

$$p_{LDist} = (L, x, x_0) = |(x, x_0)| \qquad \text{eq. 4}$$

where $x_0$ defines the original position of the label L, and $(x, x_0)$ is the vector between $x_0$ and the label position.

Leader Line Orientation:

$$p_{Ori}(L, x, x_0) = |\theta(x, x_0) - f(\text{layout})| \qquad \text{eq. 5}$$

where $\theta(x, x_0)$ defines the orientation of the leader line and f(layout) the preferred value of the orientation (e.g., π/2 for vertical or 0 for horizontal alignment).

Label Overlap:

$$p_{Overl}(L, x, x_0) = \sum_{i=1 \ldots n} \text{overlap}(L, G_i) \qquad \text{eq. 6}$$

where the overlapping region between the current label L and the n labels {G}, which have been already placed is computed. The function overlap(L,$G_i$) computes the Euclidian distance between the label L and the label $G_i$, detects overlap between the labels based on their respective sizes, and returns an overlap value using an appropriate parameterization as well understood in the art.

Additional or different constraints may be used by the objective function O if desired. For example, it may be desirable to avoid leader line overlap, which may be detected as an intersection between two leader lines. Leader line overlap may also be avoided based on the leader line orientation and the positions of the anchor points and labels.

The layout solver 220 may use, e.g., a greedy algorithm or a force-based algorithm for implementing the above-described optimization. The force-based algorithm implements penalty factors as a set of forces, and labels are moved in parallel in this force field. Labels obtain their final position after a certain number of iterations or according to a desired termination criterion. Simulated annealing may be used, as it provides accurate results, but is generally undesirable for current cellular telephones capabilities. With the force-based algorithm, the saliency map 208 may be dilated and a distance transform image may be calculated. The gradient is computed to create a repulsive force for the system (labels are pushed away from important regions). The edge map 204 is similarly treated. A complex force field (dense and isotropic) may result, for which weighting of the different forces and finding an appropriate number of iterations must be managed.

Figure 3:
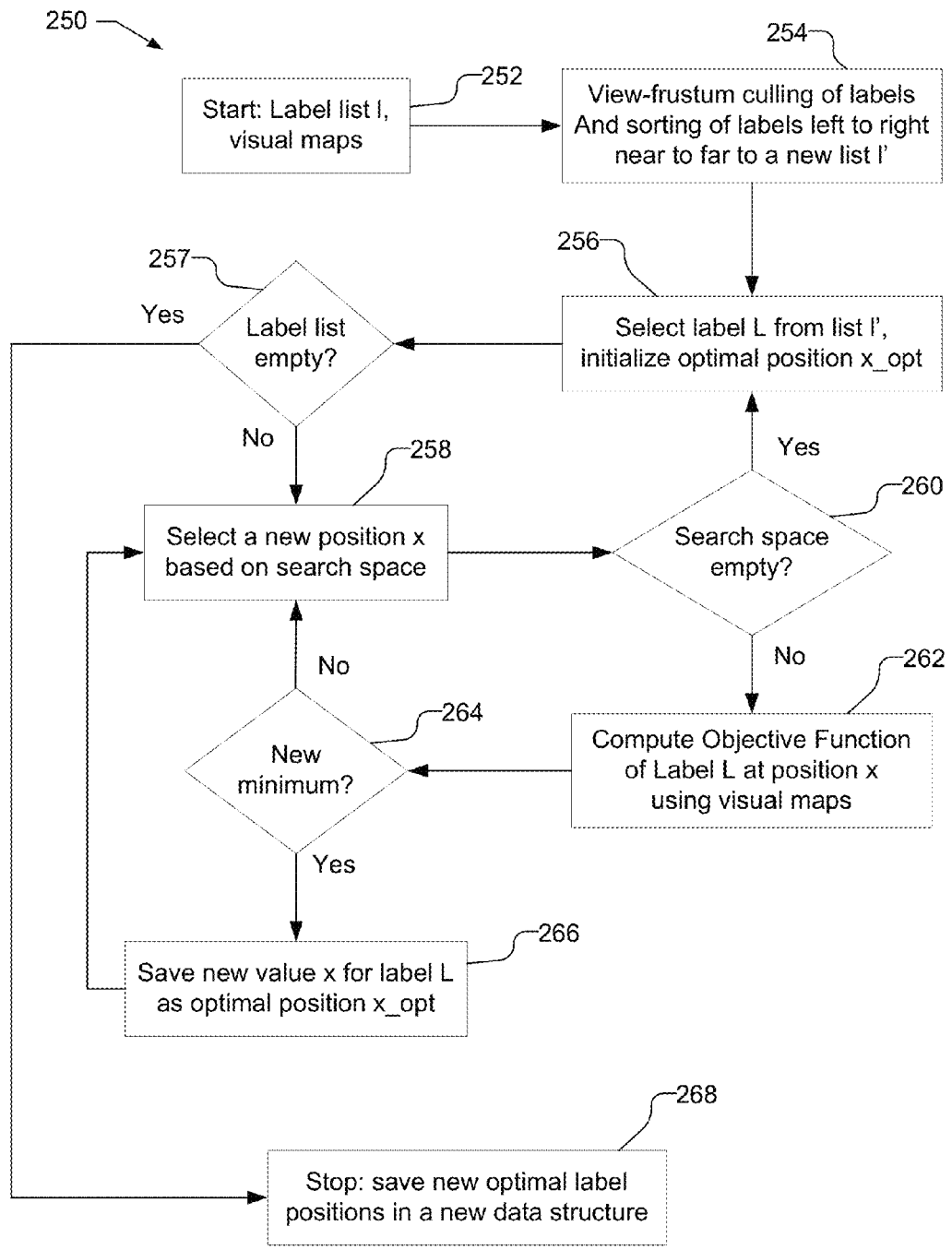
FIG. 3 is a flow chart illustrating optimization of the layout using a greedy algorithm.

The greedy algorithm sequentially optimizes each label and evaluates the objective function O for each. The minimal value among the candidate positions is selected as the position of a label. FIG. 3 is a flow chart illustrating optimization of the layout using a greedy algorithm that may be employed by the layout solver 220. As illustrated, starting with a label list l and the visual maps (252), e.g., the edge map 204 and saliency map 208, the currently visible labels in the viewing frustum are sorted from left to right and near to far to produce a new label list l' (254). The objective function O is minimized in an iterative process for each label and for different positions in the search space. For example, a label L is selected from the list l' and an optimal position x_opt is initialized (256). The initial position may be selected as the closest position to the anchor point, taking into consideration the size of the label and the desire to avoid overlap with other labels. The selection of the initial position is dependent on search space, and thus, for a top search space the initial position is the closest position above the anchor point, with a minimum distance equal to the height of the label with a small offset to avoid overlap and have some spaces between any other labels. A new position x is selected based on the search space (258). The new position may be selected as a function of the size of the label and the screen resolution. A configuration of the search space offers flexibility for the layout orientation of the labels: top, bottom, left, right, radial, and combinations of them. By way of example, the top configuration may be suitable for far points of interest in outdoor scenes, whereas a radial configuration may be suitable for annotating close objects. The objective function O for the label L at position x is computed using the visual maps (262), e.g., the edge map 204 and saliency map 208, as discussed above. If the objective function is a new minimum (264), the new value x is saved for the label L as the new optimal position x_opt (266). The process continues for a new position x (258) for the label L until the search space is empty (26) and then a new label is selected from the list l' (256). Once the label list is empty (257), the process is stopped with the optimal label positions saved in a new data structure (268).

To handle image motion and dynamic content in the video image, the process employed by the layout solver 220 may be executed at low frequency, e.g., 0.5 to 5 Hz, after initially placing all labels.

As shown in FIG. 2, the output of the layout solver 220 is provided for adaptive representation block 230, in which the representation of the labels, including the anchor, leader line, and/or background surrounding the text of a label may be adjusted. The adaptive representation block 230 considers labels with respect to the background in the image. Additionally, the distance to the point of interest may be considered by the adaptive representation block 230. The representation of one or more of the label components may be adjusted to provide good readability, e.g., by assuring contrast between the label components and the video image.

Figure 4:
FIG. 4 is an image of a building with examples of adaptive representation of different label components, including leader lines, anchor points, and backgrounds surrounding text.

One label component that may be adjusted is the leader line. A leader line is used to link a label to an anchor position when the label is moved away from the anchor position. Leader lines should be easily visible to users, but they are often difficult to discriminate from the background in the video frame when the contrast between the color of the line and the surrounding pixels is low. To address this problem, the luminance or saturation of the leader line is adjusted to make it more visible compared to its vicinity, i.e., surrounding pixels. Increasing the contrast may be done by modifying the luminance channel in a suitable color space. For example, the lightness of the leader line may be modified in HLS space. The average of the lightness (or saturation) of the pixels surrounding a leader line may be computed and the color of the leader line adjusted to yield a specified contrast. For example, the pixels surrounding the leader line may be a plurality of pixels bounded by an area with a width that is greater than the width of the leader line by a predetermined factor. A contrast threshold of 20% has been determined to be suitable, but other contrast thresholds may be used. The contrast modification can be positive (leader line getting brighter) or negative (leader line getting darker), in function of the lightness (or saturation) intensity of the leader line. FIG. 4, by way of example, illustrates an image of a building with examples of adaptive representation of different label components, including the leader line, which is shown with poor contrast for Label 1 and relatively high contrast for Label 2. The leader lines are illustrated in black and white for Label 1 and Label 2, but other levels of lightness (or saturation) intensity are possible, as illustrated by the leader line for Label 3.

Another label component that may be adjusted is the anchor point. When labels are displaced from the point of interest, anchor points are used to identify the position of the point of interest to the user. Thus, the anchor point should be prominently displayed so that it is visible to the user. Thus, the saturation and lightness of the anchor point may be modulated using the same process used for the leader lines described above to improve contrast, e.g., by average of the lightness (or saturation) of the pixels surrounding an anchor point may be computed and the color of the anchor point adjusted to yield a specified contrast.

Figure 5:
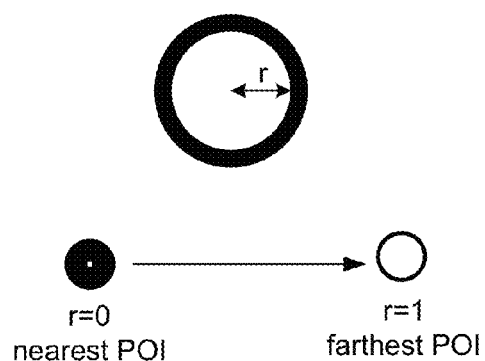
FIG. 5 illustrates adaptive representation of anchor points based on the distance to a point of interest.

Additionally, it is noted that because the image-based layout process does not have knowledge of the scene, an anchor point for a point of interest may be displayed over an object that obscures the point of interest, which poses a potential depth cue conflict. To address this issue, the representation of the anchor point may be varied based on the distance to the point of interest, which may be determined, e.g., based on a known position of the mobile device 100 and a known position of the point of interest. For example, FIG. 5 illustrates adaptive representation of anchor points based on the distance to a point of interest. As shown in FIG. 5, the anchor point may be displayed as a ring shape, with an inner radius r, used to encode the distance to the point of interest. Thus, a point of interest that is close to the user will have an anchor point that is solid or nearly solid, i.e., a disk, while a point of interest that is far from the user will have an anchor point that is a circle. To determine the appropriate radius r, the distance of the points of interest from the user's viewpoint may be rescaled to a normalized range. FIG. 4 illustrates an anchor point for Label 3 that represents a close point of interest, while the anchor point for Label 4 represents a distance point of interest, e.g., behind the building in the foreground. The anchor point may be modulated in other ways, such as modulating the opacity to encode its distance to the viewer. Hence, points of interest that are close may be fully opaque, while distant points of interest are mostly transparent.

Other label components that may be adjusted are the background surrounding the text of the label as well as the text itself. Current standard representations of information channels in ARBs use a static rendering style and generally emphasize contrast by using negative or positive color schemes for the background color/text color, (e.g., black background/white text, white background/black text). When the label overlays a dark or light area of a video frame, however, the readability is impaired. Thus, it is desirable for an active rendering style of labels that can support representation modulation of multiple points of interest or multiple visible channels at the same time. The luminance and chroma of a label may be modulated separately to adapt lightness or saturation of a label background or of its content, e.g., text. Three different approaches may be used to determine lightness and saturation; global, local or salient-relative. For the global approach, the average lightness over the full image is computed and the lightness of the label background is modulated to have a contrast difference that is above a threshold, e.g., 20%. For the local approach, the average lightness (or saturation) of the image in the neighborhood of each label's background is computed and contrast adjustment is applied separately for each label based on a threshold. For example, the neighborhood of a label's background may be a plurality of pixels bounded by an area with a size that is larger than the label's background by a predetermined factor. For the salient-relative approach, the average lightness (or saturation) of the salient regions is determined, so the labels can be more prominent with respect to the saliency information on the image. For example, the salient regions may be determined based on the highest salience level or two highest levels in the saliency map 208. FIG. 4, by way of example, illustrates Label 5 with a low contrast background with respect to the surrounding pixels and illustrates Label 6 with a relatively high contrast background.

Contextual and temporal coherence may be used to handle image motion and dynamic content in the video image. For example, to achieve temporal coherence, label movement, e.g., caused by jitter introduced by unsteadily holding the mobile device is minimized. Additionally, a label is not moved if there are only small dynamic changes in the scene. Three types of common motion include camera motion (large change of rotation/position), hand shaking/jitter motion (small change of rotation/position) and object motion (dynamic content in the video image). Rotational motion of the camera may be treated as the primary factor. It has been determined that end users generally do not interact with their augmented reality browsers while walking. For example, a survey has shown that movement patterns are mainly rotation while standing (90%) where multiple large movements (>5 m) combined with rotation is largely unused (42%). An ARB is mainly used while intermittently stopping between locations, and consequently physical interaction may be constrained to primarily rotational movement.

Figure 6:
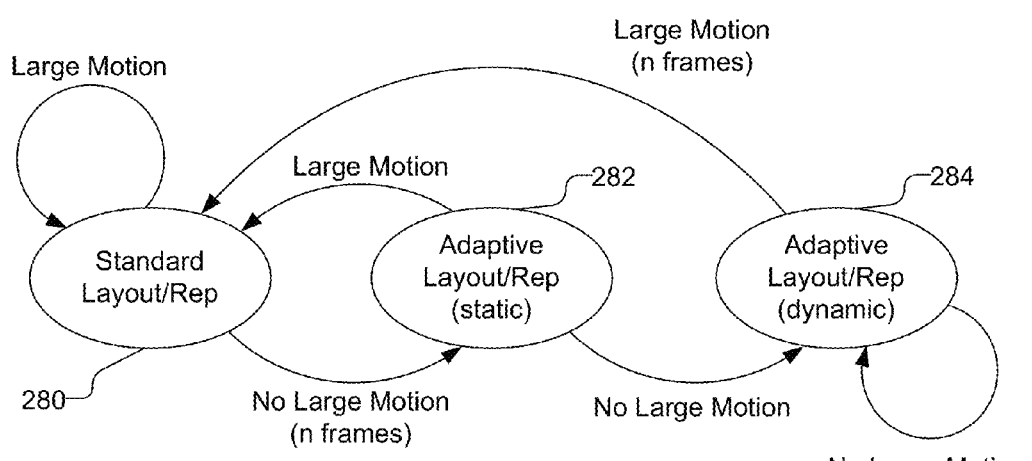
FIG. 6 illustrates a state diagram for managing the temporal coherence of displayed labels.

Thus, the temporal coherence may be based on the use of motion sensors 112 in the mobile device to determine the magnitude of the camera rotation (e.g., rotation, pitch, or tilt) in the current frame, with respect to a previous frame. FIG. 6 illustrates a state diagram that may be used for temporal coherence of displayed labels. As illustrated, there are three possible states: a standard layout representation (280), an adaptive layout representation (static) (282) and an adaptive layout representation (dynamic) (284). As illustrated in FIG. 6, when large motion is detected, e.g., using the motion sensors 112, the system will use the standard layout representation (280). Large motion may be determined as a large change in the orientation of the mobile device, e.g., by comparing the change in orientation at the present frame to a previous frame to a threshold, or a translational motion that is greater than a threshold. For example, it may be desirable to detect large motion that is greater than hand jitter or greater than, e.g., 5 degrees of change. When no large motion is detected, for a certain number n of frames, e.g., 10 frames, the adaptive layout representation (static) (282) is triggered to generate the image-based layout discussed above. If no large motion is detected after the image-based layout is generated, the adaptive layout representation (dynamic) (284) is triggered. If the user holds the mobile device steady or slowly rotates to observe the scene, the mobile device 100 stays in the dynamic state (284), performing the image-based layout process 200 at low frequency. In this condition, a label is only moved if a computed best position is relatively distant from the current position. Further, to avoid jumping labels, each label may be locally tested to determine if there is any change of the saliency or edges information and thus re-computation of the layout may be avoided. Thus, label movement, e.g., caused by jitter introduced by unsteadily holding the mobile device is minimized, thereby improving temporal coherence. Additionally, a label is not moved if there are only small dynamic changes in the scene. This filtering behavior suppresses small dynamic changes, such people or bikes passing by. Additionally, smoothing animation may be used to interpolate between the consecutive label positions to avoid the appearance of abrupt label movement. If large motion is detected over a number n of frames (e.g., the user starts to pan the mobile device from left to right), the system may return to the standard layout representation (280).

Figure 7:
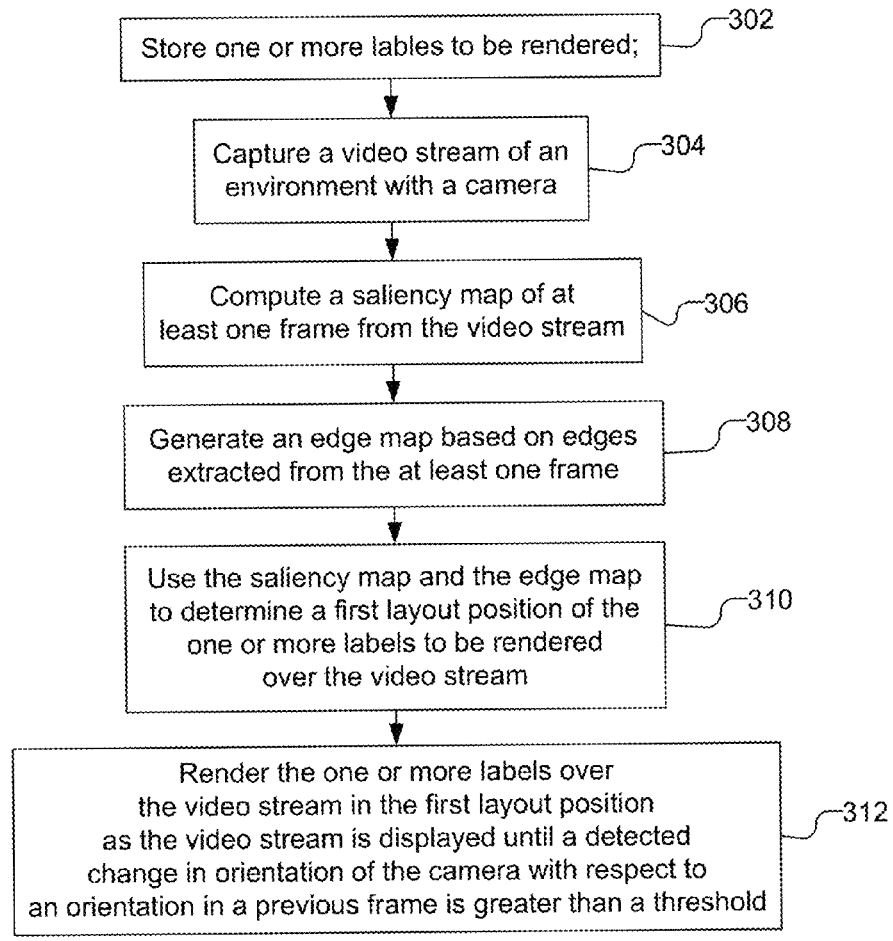
FIG. 7 is a flow chart illustrating the image-based layout process that may be used by the mobile device.

FIG. 7 is a flow chart illustrating the image-based layout process that may be used by the mobile device 100. As illustrated one or more labels that are to be rendered as stored (302). The labels to be rendered may include textual or other information that is relevant for specific points of interest. Relevant labels, for example, may be obtained from a remote database, e.g., based on a determined position of the mobile device 100, and stored in local memory or storage of the mobile device 100. A video stream of the environment is captured with a camera (304). A saliency map of at least one frame from the video stream is computed (306). The saliency map may be generated by computing an initial saliency map and applying one or more thresholds to the initial saliency map to produce a saliency map with a plurality of saliency levels. Additionally, an edge map is generated based on edges extracted from the at least one frame from the video stream (308). The saliency map and the edge map are used to determine a first layout position of the one or more labels to be rendered over the video stream (310). Determining the first layout position may include optimizing the layout position of the one or more labels based on one or more factors comprising overlap of a label with a point of interest on the saliency map, overlap of the label with the point of interest on the edge map, a length of a leader line for the label, an orientation of the leader line for the label, and overlap of the label with another label. Determining the first layout position may further include the use of a greedy algorithm and a force-based algorithm.

The one or more labels are rendered over the video stream in the first layout position as the video stream is displayed until a detected change in orientation of the camera with respect to the orientation in a previous frame is greater than a threshold (312). The change in orientation may be detected, e.g., using a motion sensor, such as an accelerometer or gyroscope or using a magnetometer. Additionally, the one or more labels may be displayed in the first layout position until a subsequently determined second layout position of the one or more labels is farther than a threshold distance from the first layout position.

Figure 8:
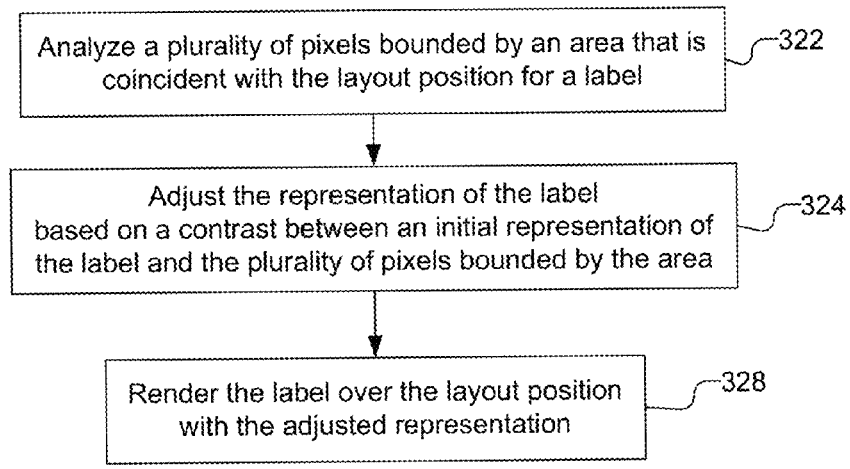
FIG. 8 illustrates a process of adaptive representation that may be used for rendering the labels, in which the representation of the labels, including the anchor, leader line, surrounding background of text of a label, may be adjusted.

FIG. 8 illustrates a process of adaptive representation that may be used for rendering the labels, in which the representation of the labels, including the anchor, leader line, background or text of a label may be adjusted. As illustrated in FIG. 8, a plurality of pixels bounded by an area that is coincident with the layout position for the label is analyzed (322), e.g., to determine an average lightness (or saturation) of the area of pixels. For example, the plurality of pixels may be contiguous or non-contiguous pixels in an area that is centered on the label (or component of the label) and which may have a size and shape that is dependent on the size and shape of the label (or component of the label). For example, the plurality of pixels bounded by the area may include pixels that are under the layout position and/or pixels that surround the layout position. Moreover, the plurality of pixels bounded by the area may include all the pixels in the image. When there is a plurality of labels, analyzing the plurality of pixels bounded by the area coincident with the layout position for the label may comprise analyzing multiple pluralities of pixels bounded by areas coincident with the plurality of labels. The representation of the label is adjusted based on a contrast between an initial representation of the label and the plurality of pixels bounded by the area coincident with the layout position for the label (324). For example, the representation of the label may be adjusted so that the contrast between the representation of the label and the plurality of pixels bounded by the area coincident with the layout position is greater than a predetermined threshold. The label is rendered over the layout position with the adjusted representation (326). The representation of the label may be adjusted by adjusting at least one component of the label, comprising a leader line, an anchor point, and background surrounding text. For example, the leader line may be adjusted by adjusting at least one of saturation and lightness of the leader line to increase a contrast with respect to the plurality of pixels bounded by the area coincident with the leader line. The anchor point may be adjusted by adjusting at least one of saturation and lightness of the anchor point to increase contrast with respect to the plurality of pixels bounded by the area coincident with the anchor point. Additionally, or alternatively, the representation of the anchor point may be adjusted based on a determined distance between the camera and a point of interest in the environment being labeled. The background surrounding the text may be adjusted by adjusting at least one of saturation and lightness of at least one of the background surrounding the text to increase contrast with respect to the plurality of pixels bounded by the area coincident with the background surrounding the text.

Figure 9:
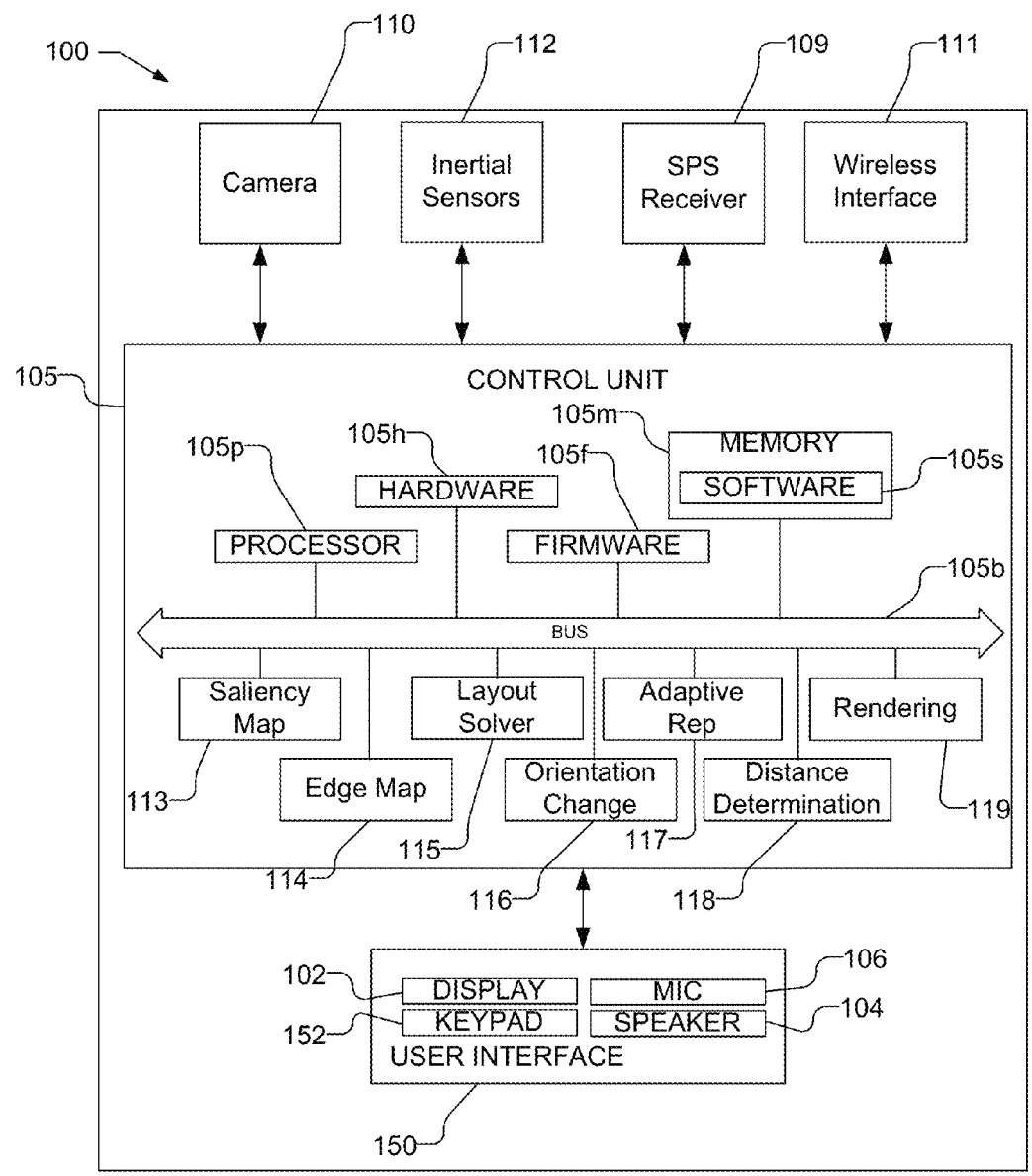
FIG. 9 is a block diagram of a mobile device capable of view management using the image-based layout process described herein.

FIG. 9 is a block diagram of a mobile device 100 capable of view management using the image-based layout process described herein. The mobile device 100 includes a camera 110 as well as motion sensors 112, such as accelerometers, gyroscopes or the like. As illustrated, the mobile device 100 may include an SPS receiver 109 to determine a position of the mobile device 100. The SPS receiver 109 for receiving position data from SPS system 122 (FIG. 1), which may be used to determine a position fix of the mobile device 100, as discussed above. The mobile device 100 may be, e.g., an A-GPS device or a standalone GPS device. The SPS receiver 109 may be capable of receiving signals from transmitters on satellite vehicles (SV) in a constellation of Global Navigation Satellite System (GNSS) such as Global Positioning System (GPS), Galileo, Glonass or Compass. The SPS receiver 109, however, is not restricted to global systems (e.g., GNSS) for SPS. For example, the various regional systems may be accessed, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system (s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 100 may further include a wireless interface 111 that may be used to communicate with a remote server 130 and database 135, e.g., to provide a position of the mobile device 100 and receive from the remote database 135 labels that are relevant to the position, as shown in FIG. 1. The wireless interface 111 may be used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The mobile device 100 further includes a user interface 150, which includes the display 102, as well as a keypad 152 or other input device through which the user can input information into the mobile device 100. If desired, the keypad 152 may be obviated by integrating a virtual keypad into the display 102 with a touch sensor (or gesture control). The user interface 150 may also include the microphone 106 and speaker 104, e.g., if the mobile device 100 is a cellular telephone or the like. Of course, mobile device 100 may include other elements unrelated to the present disclosure.

The mobile device 100 also includes a control unit 105 that is connected to and communicates with the camera 110, motion sensors 112, as well as the user interface 150, including the display 102. The control unit 105 may be provided by a bus 105b, processor 105p and associated memory 105m, hardware 105h, firmware 105f, and software 105s. The labels to be rendered may be stored, e.g., in memory 105m. The control unit 105 receives and processes the video stream by the camera 110 as well as data obtained from the motion sensors 112, as discussed above. The control unit 105 is further illustrated as including a saliency map module 113 that computers the saliency map from a frame of the video stream. The saliency map module 113 may further apply one or more thresholds to the saliency map to generate a second saliency map. An edge map module 114 generates an edge map by extracting edges from the frame of the video stream. The layout solver 115 uses the saliency map and edge map to determine a layout position for labels to be rendered over the video stream. An orientation change module 116 detecting a change in orientation of the camera with respect to the orientation in a previous frame that is greater than a threshold using data from the motion sensors 112. The adaptive representation module 117 adjusts the representation of at least one component of the label, e.g., a leader line, an anchor point, and background surrounding text, with respect to the plurality of pixels bounded by the area coincident with the layout position for the label. A distance determination module 118 determines the distance between the camera 110 and a point of interest to be labeled, e.g., based on a position fix provided by the SPS receiver 109 or provided, e.g., by trilateration using the wireless interface 111 and using information about the position of the points of interest to be labeled that may be provided by the remote server 130 and database 135 via the wireless interface 111. The rendering module 119 generates the resulting label to be shown on the display at the layout position.

The various modules, such as saliency map module 113, edge map module 114, layout solver 115, orientation change module 116, adaptive representation module 117, the distance determination module 118, and rendering module 119 are illustrated separately from processor 105$p$ for clarity, but may be part of the processor 105$p$ or implemented in the processor 105$p$ based on instructions in the software 105$s$ which is run in the processor 105$p$, or may be otherwise implemented in hardware 105$h$ and/or firmware 105$f$. It will be understood as used herein that the processor 105$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105$h$, firmware 105$f$, software 105$s$, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105$m$ and executed by the processor 105$p$. Memory 105$m$ may be implemented within or external to the processor 105$p$. If implemented in firmware and/or software, the functions may be stored as one or more instructions or code on a storage medium that is computer-readable, wherein the storage medium does not include transitory propagating signals. Examples include storage media encoded with a data structure and storage encoded with a computer program. Storage media includes physical computer storage media. A storage medium may be any available medium that can be accessed by a computer. By way of example, and not limitation, such storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of storage media.

Thus, the mobile device 100 includes means for storing one or more labels to be rendered, which may be the memory 105$m$. A means for capturing a video stream of an environment may be, e.g., the camera 110. A means for computing a saliency map of at least one frame from the video stream may be, e.g., the saliency map module 113. A means for generating an edge map with edges extracted from the at least one frame may be, e.g., the edge map module 114. A means for using the saliency map and the edge map to determine a first layout position of the one or more labels to be rendered over the video stream may be, e.g., the layout solver 115. A means for rendering the one or more labels over the video stream in the first layout position as the video stream is displayed may be, e.g., the rendering module 119. A means for detecting a change in orientation with respect to the orientation in a previous frame that is greater than a threshold may be, e.g., the orientation change module 116 using data from the motion sensors 112. A means for displaying the one or more labels in the first layout position until the change in orientation of the camera is detected may be, e.g., the display 102, as well as the orientation change module 116. A means for adjusting a representation of a label based on a plurality of pixels bounded by an area that is coincident with a layout position for a label may be, e.g., the adaptive representation module 117. A means for determining a distance to a point of interest in the environment being labeled may be, e.g., the distance determination module 118 using data provided by the SPS receiver 109 and/or wireless interface 111. A means adjusting a representation of the anchor point based on the distance may be the adaptive representation module 117.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   storing one or more labels to be rendered;
   capturing a video stream of an environment with a camera;
   computing a saliency map of at least one frame from the video stream;
   generating an edge map with edges extracted from the at least one frame;

using the saliency map and the edge map together to determine a first layout position of the one or more labels to be rendered over the video stream;
rendering the one or more labels over the video stream in the first layout position as the video stream is displayed;
detecting a change in orientation of the camera with respect to the orientation in a previous frame that is greater than a threshold; and
displaying the one or more labels in the first layout position until the change in orientation of the camera is detected.

2. The method of claim 1, wherein computing the saliency map of the at least one frame comprises computing an initial saliency map of the at least one frame and applying one or more thresholds to the initial saliency map.

3. The method of claim 1, wherein using the saliency map and the edge map together to determine the first layout position comprises optimizing positions of the one or more labels based on one or more factors comprising overlap of a label with a point of interest on the saliency map, overlap of the label with the point of interest on the edge map, a length of a leader line for the label, an orientation of the leader line for the label, and overlap of the label with another label.

4. The method of claim 3, wherein optimizing the positions of the one or more labels comprises using one of a greedy algorithm and a force-based algorithm.

5. The method of claim 1, wherein rendering the one or more labels comprises:
analyzing a plurality of pixels bounded by an area that is coincident with a layout position for a label;
adjusting a representation of the label based on a contrast between an initial representation of the label and the plurality of pixels bounded by the area; and
rendering the label over the layout position with the adjusted representation.

6. The method of claim 5, wherein the plurality of pixels bounded by the area that is coincident with the layout position for the label comprises at least one of pixels located under the label and pixels located around the label.

7. The method of claim 5, wherein adjusting the representation of the label comprises adjusting at least one component of the label comprising a leader line, an anchor point, and background surrounding text.

8. The method of claim 7, wherein adjusting the leader line comprises adjusting at least one of saturation and lightness of the leader line to increase the contrast with respect to the plurality of pixels bounded by the area that is coincident with the leader line.

9. The method of claim 7, wherein adjusting the anchor point comprises adjusting at least one of saturation and lightness of the anchor point to increase contrast with respect to the plurality of pixels bounded by the area that is coincident with the anchor point.

10. The method of claim 7, wherein adjusting the background surrounding text comprises adjusting at least one of saturation and lightness of at least one of the background surrounding text to increase contrast with respect to the plurality of pixels bounded by the area that is coincident with the background surrounding text.

11. The method of claim 5, wherein the plurality of pixels bounded by the area comprises all pixels in the at least one frame.

12. The method of claim 5, wherein there are a plurality of labels, wherein analyzing the plurality of pixels bounded by the area that is coincident with the layout position for the label comprises analyzing multiple pluralities of pixels bounded by areas coincident with layout positions of the plurality of labels.

13. The method of claim 1, wherein the method further comprises determining a distance from the camera to a point of interest in the environment being labeled, and adjusting a representation of an anchor point based on the distance.

14. The method of claim 1, wherein the one or more labels are rendered over the video stream in the first layout position until a subsequently determined second layout position of the one or more labels is farther than a threshold distance from the first layout position.

15. An apparatus comprising:
a camera that captures a video stream of an environment;
motion sensors that produce data in response to movement;
a display;
memory for storing one or more labels to be rendered; and
a processor coupled to the display, coupled to the camera to receive the video stream of the environment, coupled to the motion sensors to receive the data in response to the movement, and coupled to the memory for receiving the one or more labels to be rendered, the processor configured to compute a saliency map of at least one frame from the video stream, generate an edge map with edges extracted from the at least one frame, use the saliency map and the edge map together to determine a first layout position of the one or more labels to be rendered over the video stream, and render the one or more labels over the video stream in the first layout position as the video stream is displayed on the display, detect a change in orientation of the camera with respect to the orientation in a previous frame that is greater than a threshold using the data produced by the motion sensors, and display the one or more labels in the first layout position until the change in orientation of the camera is detected.

16. The apparatus of claim 15, wherein the processor is configured to compute the saliency map of the at least one frame from the video stream by being configured to compute an initial saliency map of the at least one frame and apply one or more thresholds to the initial saliency map.

17. The apparatus of claim 15, wherein the processor is configured to use the saliency map and the edge map together to determine the first layout position by being configured to optimize a layout position of the one or more labels based on one or more factors comprising overlap of a label with a point of interest on the saliency map, overlap of the label with the point of interest on the edge map, a length of a leader line for the label, an orientation of the leader line for the label, and overlap of the label with another label.

18. The apparatus of claim 17, wherein the processor is configured to optimize the layout position of the one or more labels by being configured to use one of a greedy algorithm and a force-based algorithm.

19. The apparatus of claim 15, wherein the processor is configured to render the one or more labels by being configured to:
analyze a plurality of pixels bounded by an area that is coincident with a layout position for a label;
adjust a representation of the label based on a contrast between an initial representation of the label and the plurality of pixels bounded by the area; and
render the label over the layout position with the adjusted representation.

20. The apparatus of claim 19, wherein the plurality of pixels bounded by the area that is coincident with the layout position for the label comprises at least one of pixels located under the label and pixels located around the label.

21. The apparatus of claim 19, wherein the processor is configured to adjust the representation of the label by being configured to adjust at least one component of the label comprising a leader line, an anchor point, and background surrounding text.

22. The apparatus of claim 21, wherein the processor is configured to adjust the leader line by being configured to adjust at least one of saturation and lightness of the leader line to increase the contrast with respect to the plurality of pixels bounded by the area that is coincident with the leader line.

23. The apparatus of claim 21, wherein the processor is configured to adjust the anchor point by being configured to adjust at least one of saturation and lightness of the anchor point to increase contrast with respect to the plurality of pixels bounded by the area that is coincident with the anchor point.

24. The apparatus of claim 21, wherein the processor is configured to adjust the background surrounding text by being configured to adjust at least one of saturation and lightness of at least one of the background surrounding text to increase contrast with respect to the plurality of pixels bounded by the area that is coincident with the background surrounding text.

25. The apparatus of claim 19, wherein the plurality of pixels bounded by the area comprises all pixels in the at least one frame.

26. The apparatus of claim 19, wherein there are a plurality of labels, wherein the processor is configured to analyze the plurality of pixels bounded by the area that is coincident with the layout position for the label by being configured to analyze multiple pluralities of pixels bounded by areas coincident with layout positions of the plurality of labels.

27. The apparatus of claim 15, the apparatus further comprising a satellite positioning system receiver coupled to the processor, wherein the processor is further configured to determine a distance from the camera to a point of interest in the environment being labeled based on data received from the satellite positioning system receiver, and adjust a representation of an anchor point based on the distance.

28. The apparatus of claim 15, wherein the processor is configured to render the one or more labels over the video stream in the first layout position until a subsequently determined second layout position of the one or more labels is farther than a threshold distance from the first layout position.

29. An apparatus comprising:
means for storing one or more labels to be rendered;
means for capturing a video stream of an environment;
means for computing a saliency map of at least one frame from the video stream;
means for generating an edge map with edges extracted from the at least one frame;
means for using the saliency map and the edge map together to determine a first layout position of the one or more labels to be rendered over the video stream;
means for rendering the one or more labels over the video stream in the first layout position as the video stream is displayed;
means for detecting a change in orientation with respect to the orientation in a previous frame that is greater than a threshold; and
means for displaying the one or more labels in the first layout position until the change in orientation is detected.

30. The apparatus of claim 29, wherein the means for computing a saliency map computes an initial saliency map of the at least one frame and applies one or more thresholds to the initial saliency map.

31. The apparatus of claim 29, wherein the means for using the saliency map and the edge map together to determine the first layout position optimizes a layout position of the one or more labels based on one or more factors comprising overlap of a label with a point of interest on the saliency map, overlap of the label with the point of interest on the edge map, a length of a leader line for the label, an orientation of the leader line for the label, and overlap of the label with another label and using one of a greedy algorithm and a force-based algorithm.

32. The apparatus of claim 29, further comprising means for adjusting a representation of a label based on a plurality of pixels bounded by an area that is coincident with a layout position for the label.

33. The apparatus of claim 32, wherein the means for adjusting the representation of the label adjusts a contrast of at least one component of the label with respect to the plurality of pixels bounded by the area that is coincident with the layout position for the label, the at least one component of the label comprising a leader line, an anchor point, and background surrounding text.

34. The apparatus of claim 29, further comprising means for determining a distance to a point of interest in the environment being labeled, and means for adjusting a representation of an anchor point based on the distance.

35. A non-transitory storage medium including program code stored thereon, comprising:
program code to compute a saliency map of at least one frame from a video stream captured by a camera;
program code generate an edge map with edges extracted from the at least one frame;
program code to use the saliency map and the edge map together to determine a first layout position of one or more labels to be rendered over the video stream;
program code to render the one or more labels over the video stream in the first layout position as the video stream is displayed;
program code to detect a change in orientation of the camera with respect to the orientation in a previous frame that is greater than a threshold; and
program code to display the one or more labels in the first layout position over the video stream until the change in orientation of the camera is detected.

36. The storage medium of claim 35, wherein the program code to compute the saliency map of the at least one frame includes program code to compute an initial saliency map of at least one frame and to apply one or more thresholds to the initial saliency map.

37. The storage medium of claim 35, wherein the program code to use the saliency map and the edge map together to determine the first layout position comprises program code to optimize a layout position of the one or more labels based on one or more factors comprising overlap of a label with a point of interest on the saliency map, overlap of the label with the point of interest on the edge map, a length of a leader line for the label, an orientation of the leader line for the label, and overlap of the label with another label and using one of a greedy algorithm and a force-based algorithm.

38. The storage medium of claim 35, further comprising program code to adjust representation of a label based on a plurality of pixels bounded by an area that is coincident with a layout position for the label.

39. The storage medium of claim 38, wherein the program code to adjust the representation of the label comprises program code to adjust a contrast of at least one component of the label with respect to the plurality of pixels bounded by the area that is coincident with the layout position for the label, the at least one component of the label comprising a leader line, an anchor point, and background surrounding text.

40. The storage medium of claim 35, further comprising program code to determine a distance from the camera to a point of interest being labeled, and program code to adjust a representation of an anchor point based on the distance.

* * * * *